No. 698,752. Patented Apr. 29, 1902.
A. SMITH.
MACHINE FOR TURNING CASTER WHEELS.
(Application filed Dec. 2, 1901.)
(No Model.) 9 Sheets—Sheet 4.

Fig. 5.

Witnesses: E. F. Wilson, John Snowhook

Inventor: Andrew Smith
By Rudolph Wm. Lotz, Atty

No. 698,752. Patented Apr. 29, 1902.
A. SMITH.
MACHINE FOR TURNING CASTER WHEELS.
(Application filed Dec. 2, 1901.)
(No Model.) 9 Sheets—Sheet 6.

Witnesses: Inventor:
E. F. Wilson Andrew Smith
John Snowhook By Rudolph Wm. Lotz Atty.

No. 698,752. Patented Apr. 29, 1902.
A. SMITH.
MACHINE FOR TURNING CASTER WHEELS.
(Application filed Dec. 2, 1901.)
(No Model.) 9 Sheets—Sheet 7.

Witnesses:
E. F. Wilson
John Snowhook

Inventor:
Andrew Smith
By Rudolph Wm. Lotz
Attorney.

THE NORRIS PETERS CO., PHOTO-LITHO., WASHINGTON, D. C.

No. 698,752. Patented Apr. 29, 1902.
A. SMITH.
MACHINE FOR TURNING CASTER WHEELS.
(Application filed Dec. 2, 1901.)
(No Model.) 9 Sheets—Sheet 8.

Witnesses:
E. F. Wilson
John Snowhook

Inventor:
Andrew Smith
By Rudolph M. Lotz
Attorney.

THE NORRIS PETERS CO., PHOTO-LITHO., WASHINGTON, D. C.

No. 698,752. Patented Apr. 29, 1902.
A. SMITH.
MACHINE FOR TURNING CASTER WHEELS.
(Application filed Dec. 2, 1901.)
(No Model.) 9 Sheets—Sheet 9.

UNITED STATES PATENT OFFICE.

ANDREW SMITH, OF CHICAGO, ILLINOIS.

MACHINE FOR TURNING CASTER-WHEELS.

SPECIFICATION forming part of Letters Patent No. 698,752, dated April 29, 1902.

Application filed December 2, 1901. Serial No. 84,465. (No model.)

*To all whom it may concern:*

Be it known that I, ANDREW SMITH, a citizen of the United States, residing at Chicago, in the county of Cook and State of Illinois, have invented certain new and useful Improvements in Machines for Turning Caster-Wheels, &c.; and I do hereby declare the following to be a full, clear, and exact description of the invention, such as will enable others skilled in the art to which it appertains to make and use the same.

My invention relates to a novel construction in a machine for turning caster-wheels, bail-handles, billiard-buttons, &c., the object being to provide a machine of this description which will turn out a large number of such articles at each operation from a block of wood, thereby greatly reducing the cost of manufacture; and it consists in the features of construction and combinations of parts hereinafter fully described and claimed.

In the accompanying drawings, illustrating my invention.

My invention consists, essentially, in providing means for clamping a short section cut from the end of a block or log of wood between two plates, both of which are provided with a series of openings in alinement with each other, through which cutting-tools pass which bore and cut the block from both ends, and thereby shape the wheels directly from the solid block. In place of a single block a number of strips of less width may be laid side by side and the wheels cut therefrom.

Figures 13, 15:
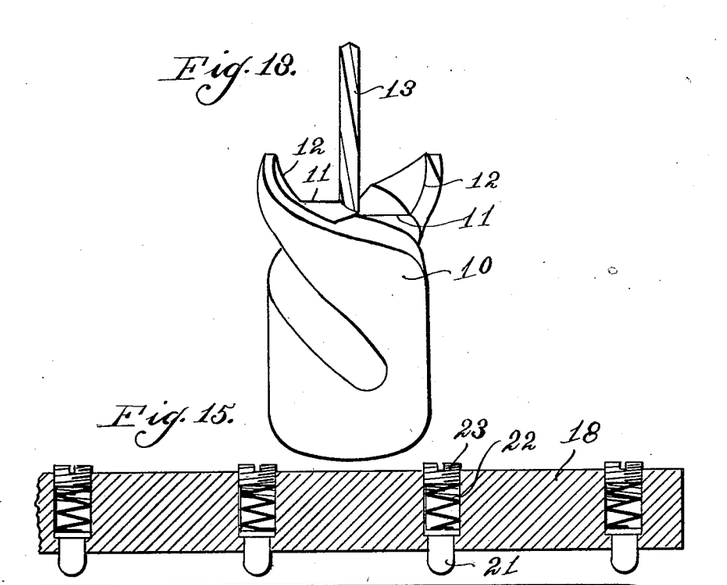
Fig. 13 is a perspective detail elevation of one of the milling tools or cutters employed.
Fig. 15 is a section of same on the line 15 15 of Fig. 14.
Figure 14:
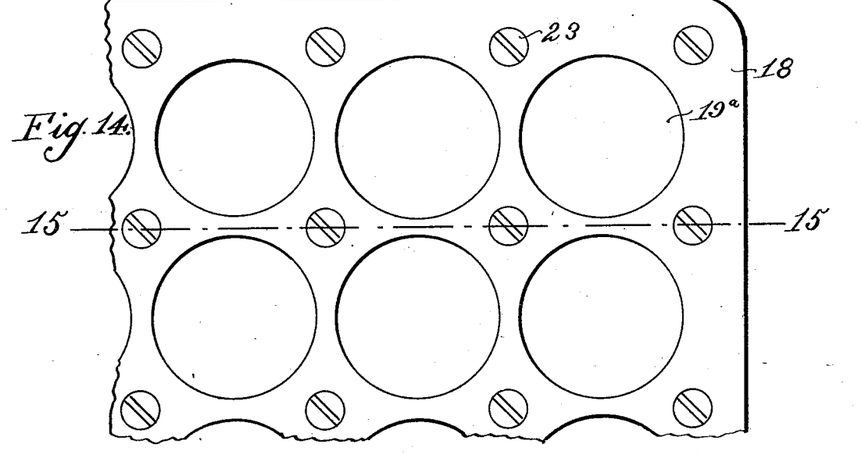
Fig. 14 is a fragmentary top plan view of the upper plate forming one of the block-carriers.
Figure 16:
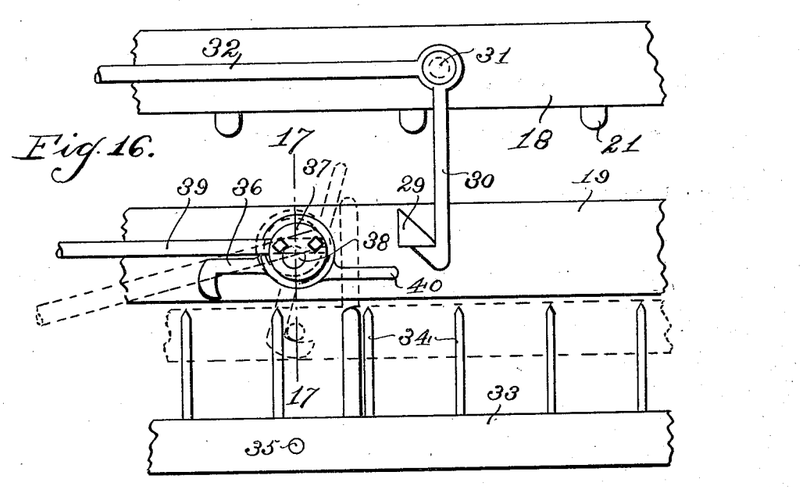
Fig. 16 is a detail view in elevation of the clamping mechanisms employed to clamp the block between the plates and for drawing up the spur-plate to cause the spurs carried thereby to enter the block.
Figure 17:
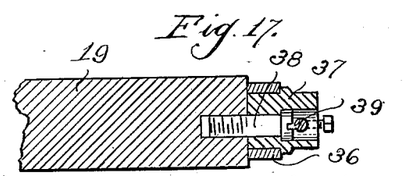
Fig. 17 is a detail section on the line 17 17 of Fig. 16.
Figure 18:
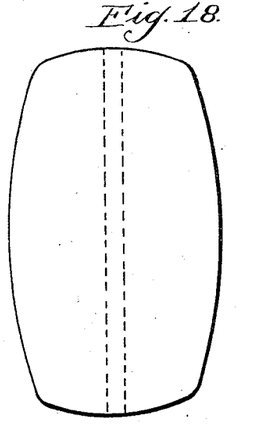
Figs. 18, 19, 20, and 21 are views showing various shapes of devices adapted to be turned out by my machine.
Figure 19:
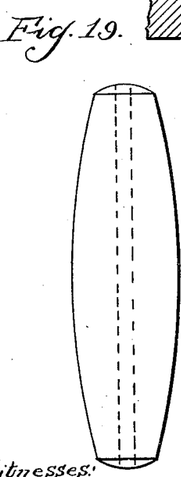
Figure 20:
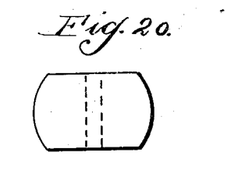
Figure 21:
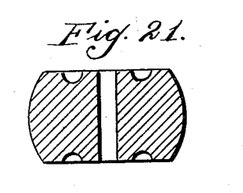

My said machine consists of a supporting-frame 1, on which two sets of horizontal bearing-plates 2 and 3 are rigidly mounted. Each of said sets of bearing-plates carries a series of vertical spindles 4, each provided with a pulley 5. Each of said pulleys 5 is provided with two circumferential ribs or flanges 6, dividing same into three parts, the end parts being adapted each to have a narrow driving-belt 7 trained over same and the middle part to have a wide belt 8 trained over same. Said wide belt 8 engages the pulley diametrically opposite to the narrow belts 7, thereby neutralizing side pressure on the bearings of said spindles. Said belts 7 and 8 are also trained over idlers 9, journaled in the end portions of said bearing-plates 2 and 3. In the instance illustrated I have shown twenty-five spindles 4 and five of said idlers 9; but these numbers may be increased or diminished, as desired, without departing from the spirit of my invention. The said belts 7 and 8 receive their motion from pulleys which may be carried by the frame of the machine or may be adjacent same. Each of said spindles 4 carries a cutting-tool 10, (shown in detail in Fig. 13,) which comprises a cutter-head having horizontal cutting edges 11, adapted to shape the ends of the caster-wheels, and flanges 12, adapted to form one-half the periphery or face of the wheel. Said tool also carries a bit 13, which is adapted to bore the block before the caster-wheel is shaped. Both sets of spindles may carry cutters having such bits 13; but as caster-wheels are not of great length one set may carry smooth bits 14. When the machine is used for cutting bail-handles or similar articles of considerable length, it is preferable to bore same from both sides in order to save bits, as the latter when long are very apt to break.

The standards forming part of the frame of the machine have guide-grooves 15 formed therein, which receive guide-ribs 16 on flanges 17 of two clamping-plates 18 and 19, between which the block from which the wheels are cut is clamped and by means of which said block is carried into the sphere of operation of said cutters. Each of said plates 18 and 19 is provided with openings 19ª, through which the cutters pass, and said plate 18 is provided with a series of pockets 20, each of which contains a pressure-pin 21, actuated by a spring 22, which is compressed in said pocket by means of the screw-threaded plug 23, entering said pocket at the top. Said pressure-pins serve to increase the frictional hold on the block in an obvious manner.

Figure 1:
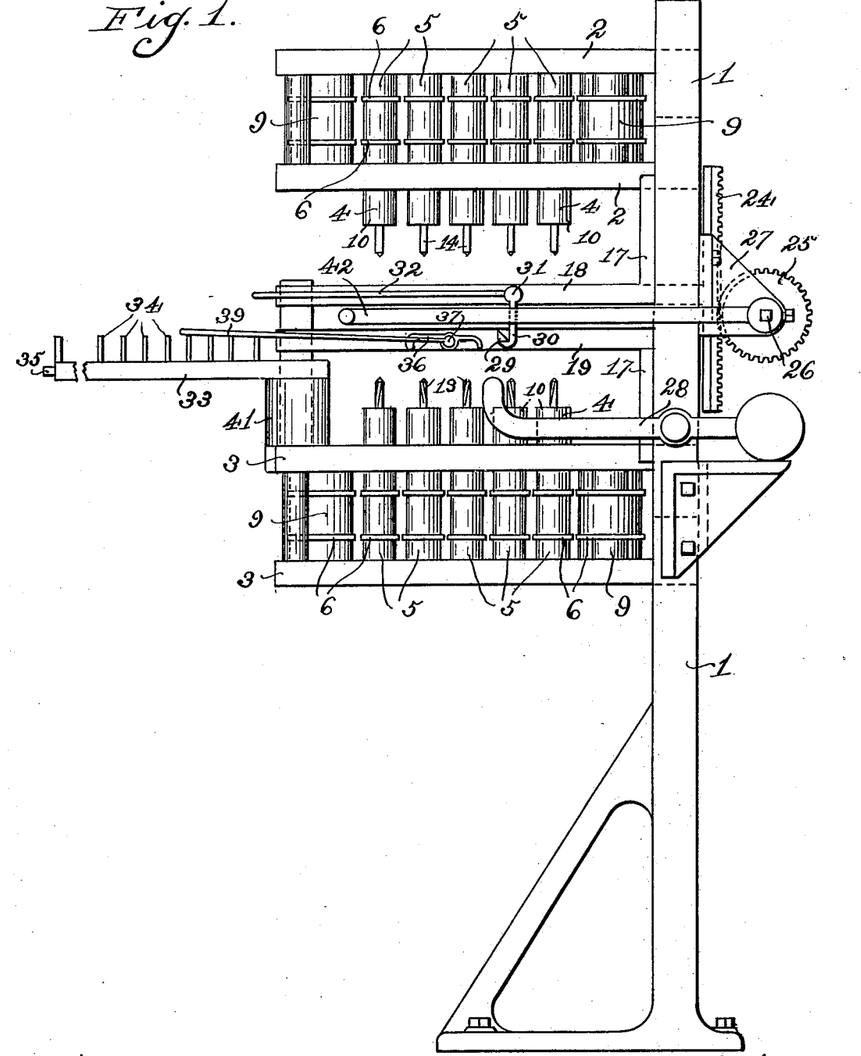
Figure 1 is a side elevation of a machine constructed in accordance with my invention.
Figure 2:
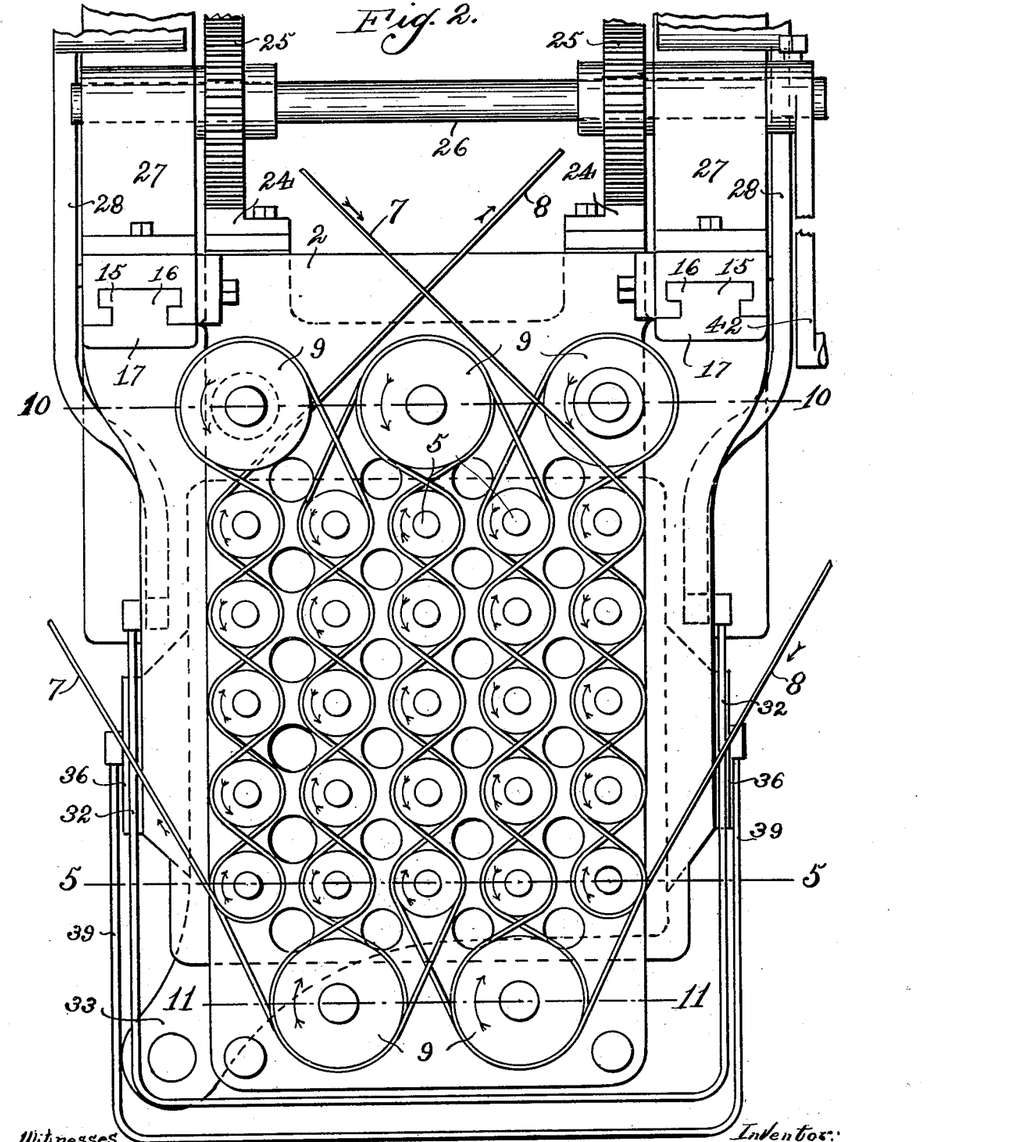
Fig. 2 is a top plan view of same with the top bearing-plate removed.
Figures 3, 4:
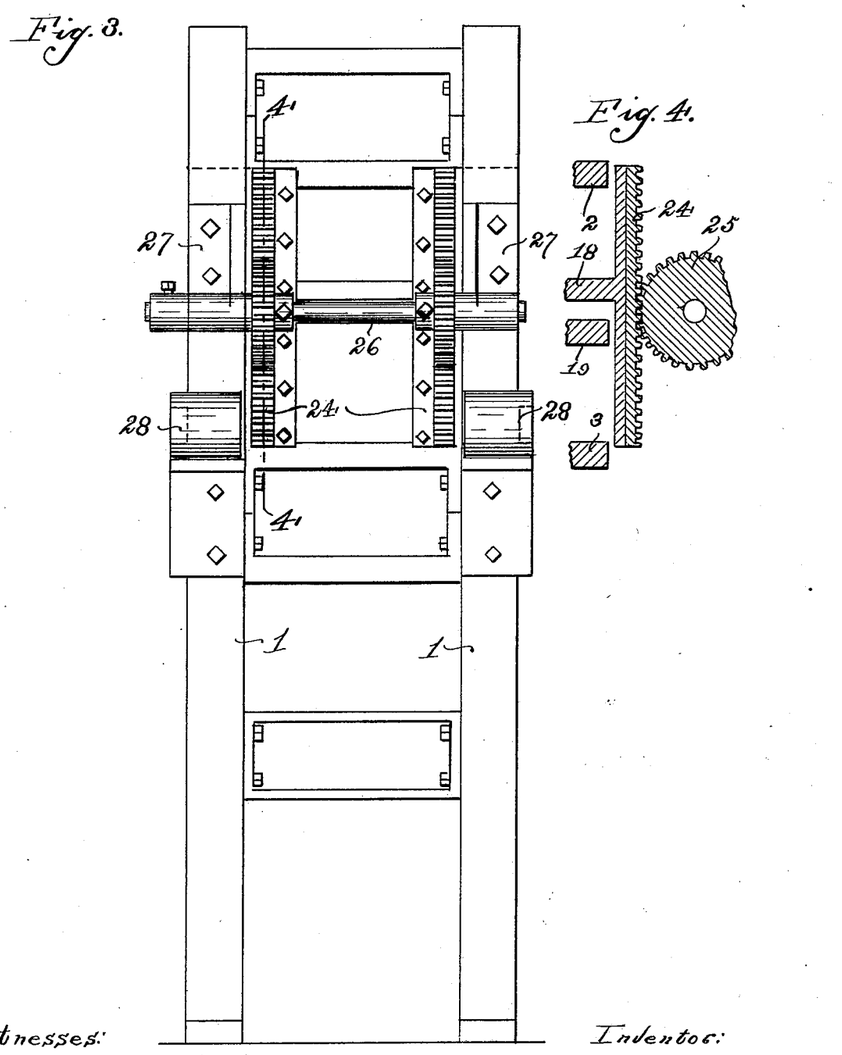
Fig. 3 is a rear elevation of same.
Fig. 4 is a detail sectional view on the line 4 4 of Fig. 3.
Figure 5:
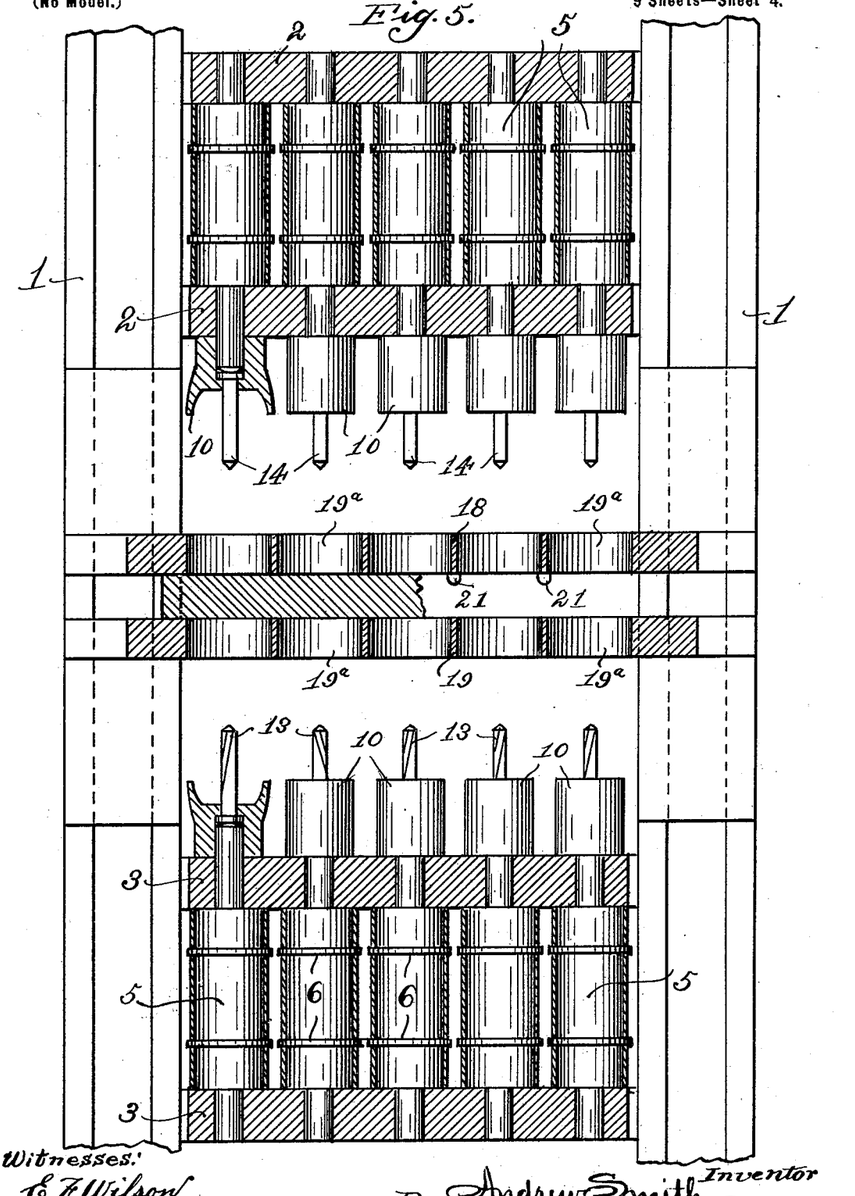
Fig. 5 is a fragmentary detail section, on an enlarged scale, on the line 5 5 of Fig. 2, the levers, &c., for operating the plates carrying the block being omitted.
Figure 6:
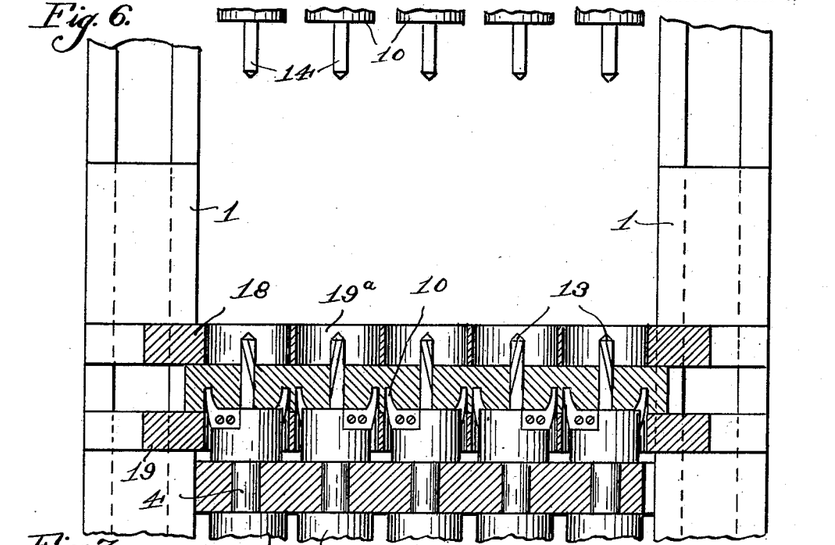
Fig. 6 is a fragmentary section similar to Fig. 5 and showing the plates carrying the block at the lower limit of their movement.
Figure 7:
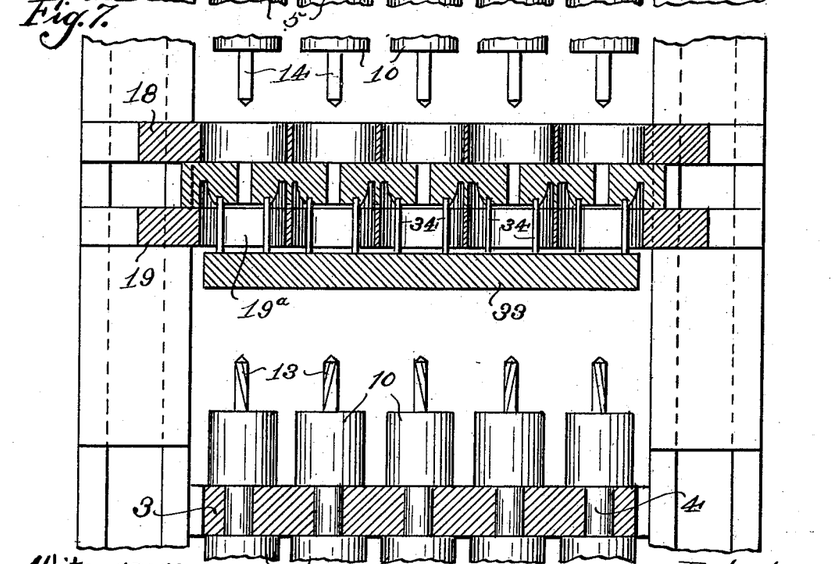
Fig. 7 is a fragmentary section similar to Fig. 5, showing the spur-plate in place.
Figure 8:
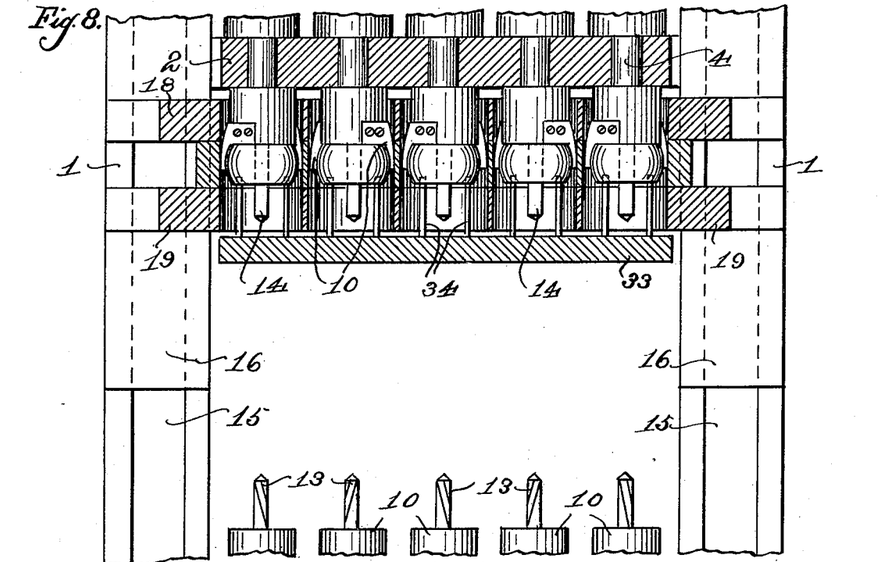
Fig. 8 is a fragmentary section similar to Figs. 5 and 6, showing the plates carrying the block at the upper limit of their movement.
Figure 9:
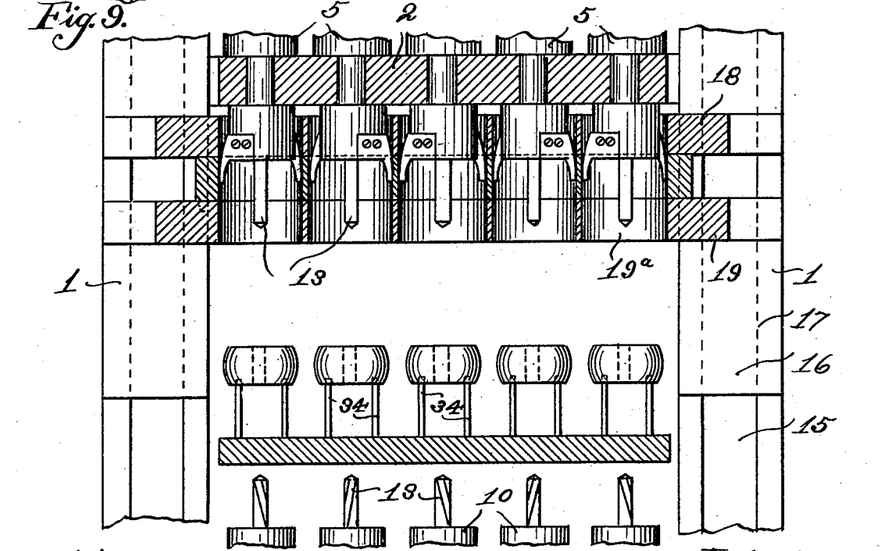
Fig. 9 is a similar section to Fig. 8, showing the spur-plate lowered and carrying the finished caster-wheels.
Figure 10:
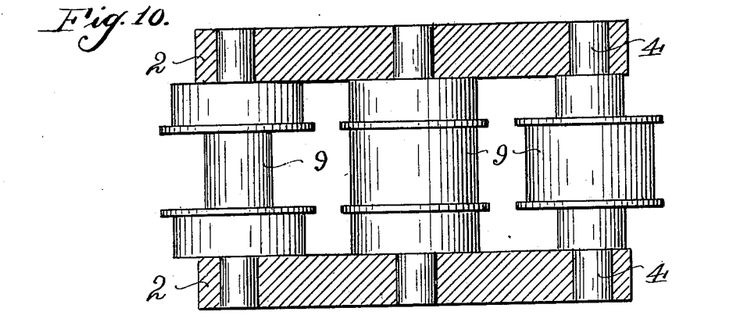
Figs. 10 and 11 are fragmentary detail sections on the lines 10 10 and 11 11, respectively, of Fig. 2.
Figure 11:
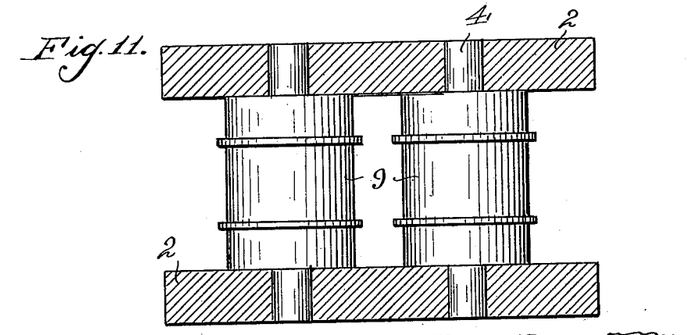
Figure 12:
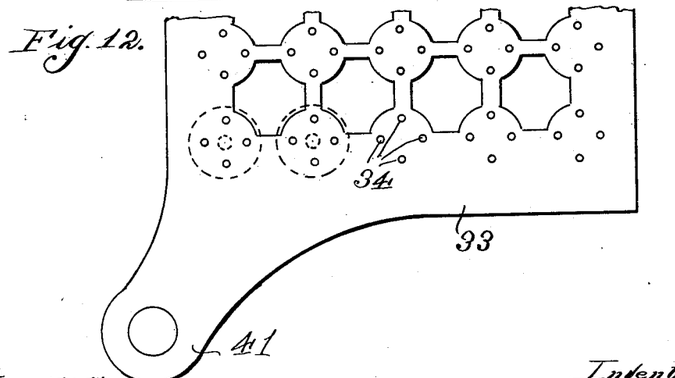
Fig. 12 is a fragmentary top plan view of the spur-plate.

The plate 18 carries rack-bars 24 at its rear end, which mesh with gear-wheels 25, carried by a crank-shaft 26, journaled in bearings 27 on the frame 1, so that by turning said crank-shaft said plate 18 is raised and lowered. The plate 19 normally rests upon the ends of counter-weighted levers 28, pivotally mounted on the frame of the machine, said levers serving to prevent said plate from dropping sufficiently to bring a block resting thereon into the path of the drills or cutters carried by the lower spindles. In operation the block is laid upon said plate 19, and the plate 18 is then lowered upon the upper face of the block. The plate 19 is provided with a lug 29 on each side, which is adapted to be engaged by a hook 30, pivotally mounted on a trunnion 31 on the said plate 18. The said hook 30 is integral with a lever 32, by means of which it is turned to engage the said lug 29 when the plate 18 has been forced down upon the block against the action of the pressure-pins 21. After the block is thus clamped between the plates 18 and 19 the latter are lowered upon the lower series of cutter-heads, whereby the block is first drilled and then cut to half form wheels therein. After completing this operation said plates 18 and 19 are raised a sufficient distance to permit a plate 33, which is pivotally mounted on the uppermost bearing-plate 3, to be swung into position beneath the plate 19. The said plate 33 carries a series of pins 34, so arranged relatively to said openings 19ª in the plate 19 that four of said pins will enter each of said openings and enter the lower side of each of the half-formed wheels in said block. In order to force the ends of said pins into the wood, it is necessary that said plate 33 be drawn up with considerable force, and to effect this I provide lugs 35 on each side of said plate 33, which are engaged by hooks 36, pivotally mounted on eccentrics 37, revolubly mounted on trunnions 38 on the plate 19, said eccentrics being integral with levers 39, by means of which they are turned. The hooks 36 are first turned to engage the lugs 35 by means of the levers 40, and the eccentrics 37 are then turned to draw the hooks up, thereby drawing up said plate 33 with sufficient force to cause the pins 34 to embed themselves in the wood, as shown in Fig. 7. The pivotal connection between the plate 33 and the upper bearing-plate 3 is effected by forming a sleeve 41 on said plate 33, which fits over a trunnion on the plate 3, so that said plate 33 may be lifted. After said plate 33 has been drawn up, as described, the crank-shaft 26 is turned, by means of the crank-handle 42 thereon, to raise the plates 18, 19, and 33, thereby bringing the block up to the upper series of cutter-heads, which form the other half of each of the wheels, the pins 34 on the plate 33 supporting said wheels in proper position until finished. The wheels are thus entirely free from the block and ready to be removed. To this end the plate 33 is released and removed, the wheels taken from the pins, and said plate replaced in the position shown in Fig. 1. The plates 18 and 19 are then lowered, the hooks 30 released, and the plate 18 raised, thereby permitting the block to be removed.

I claim as my invention—

1. In a machine of the kind specified, the combination with the frame, rigid bearing-plates carried thereby, and spindles carrying cutter-heads journaled in said bearing-plates, of clamping-plates movably mounted on said frame and movable toward and away from said bearing-plates, openings in said clamping-plates through which said cutter-heads pass to act on a block carried between said clamping-plates, and devices for engaging said block through said openings in one of said clamping-plates to receive and hold the pieces cut out of said block by said cutter-heads.

2. In a machine of the kind specified, the combination with two sets of bearing-plates, each having a plurality of spindles journaled therein, and cutter-heads on said spindles adapted to act on opposite sides of a block of wood or other material, of clamping-plates between said bearing-plates adapted to carry said block, openings in said plates through which said cutter-heads pass, devices engaging said block through said openings to receive and hold the pieces cut out of said block, and means for imparting relative motion to said clamping-plates and said bearing-plates toward and away from each other.

3. In a machine of the kind specified, the combination with two sets of bearing-plates, a plurality of spindles journaled therein, and cutter-heads on said spindles adapted to operate on opposite sides of a block of wood or other material to be cut, of clamping-plates between which the block is adapted to be held, openings in said plates through which said cutter-heads pass, a plate carrying pins adapted to pass through said openings in one of said plates to engage the partially-cut pieces, means for holding said plate in place, and means for moving said clamping-plate toward and away from said bearing-plates.

4. In a machine of the kind specified, the combination with two sets of bearing-plates, spindles journaled therein, and cutter-heads on said spindles, of clamping-plates between which the block to be cut is clamped, openings in said plates for the passage of said cutter-heads, and spring-actuated pins mounted in one of said clamping-plates between the openings therein, adapted to bear upon the block with a yielding pressure, whereby inequalities in the surface of the block are prevented from decreasing the clamping action of said plates, substantially as described.

5. In a machine of the kind specified, the combination with two bearing-plates and a series of spindles journaled therein, of a pulley on each of said spindles between said plates, each of said pulleys being provided with circumferential flanges between its ends dividing the face of same into three parts, of three belts trained over each of said pulleys, two of said belts engaging the end portions of the faces of each of said pulleys on one side, and the other of said belts engaging the middle portion of said pulley on the opposite side, whereby side pressure exerted by said belts on the bearings of said spindles will be neutralized.

In testimony whereof I affix my signature in presence of two witnesses.

ANDREW SMITH.

Witnesses:
E. F. WILSON,
RUDOLPH WM. LOTZ,